(12) United States Patent
Czyzewski (10) Patent No.: US 7,890,423 B2
(45) Date of Patent: Feb. 15, 2011

(54) METHODS AND SYSTEMS FOR ADJUSTING ACCOUNT TERMS BASED ON PURCHASE TRANSACTION INFORMATION

(75) Inventor: Nathan T. Czyzewski, Arlington, VA (US)

(73) Assignee: Capital One Financial Corporation, Falls Church, VA (US)

( * ) Notice: Subject to any disclaimer, the term of this patent is extended or adjusted under 35 U.S.C. 154(b) by 968 days.

(21) Appl. No.: 11/006,859

(22) Filed: Dec. 8, 2004

(65) Prior Publication Data

US 2005/0144105 A1 Jun. 30, 2005

Related U.S. Application Data

(60) Provisional application No. 60/527,305, filed on Dec. 8, 2003.

(51) Int. Cl.
*G06Q 40/00* (2006.01)
(52) U.S. Cl. .................. 705/40; 705/35; 705/14
(58) Field of Classification Search ............ 705/14, 705/35, 40
See application file for complete search history.

(56) References Cited

U.S. PATENT DOCUMENTS

| | | | |
|---|---|---|---|
| 5,025,372 A | 6/1991 | Burton et al. | |
| 5,297,026 A | 3/1994 | Hoffman | |
| 5,933,817 A | 8/1999 | Hucal | |
| 5,970,478 A | 10/1999 | Walker et al. | |
| 6,018,718 A * | 1/2000 | Walker et al. | 705/14 |
| 6,434,534 B1 | 8/2002 | Walker et al. | |
| 2002/0188533 A1 | 12/2002 | Sanchez et al. | |
| 2003/0061097 A1 * | 3/2003 | Walker et al. | 705/14 |

OTHER PUBLICATIONS

Yvette D. Kantrow, "American Express Sets Three-Tier Pricing on Optima Series: 4," Dow Jones & Reuters, American Banker, vol. 157, No. 025, 1992, pp. 1-2.

Megan Johnston, "Best Credit Card Perks," CNN Money, Money Magazine, Dec. 5, 2003, pp. 1-4.

Zachery Kouwe, "Best Deal Yet? 0% Interest—'For Life'—Credit-Card Issuers Offer to Lock In Low Rates on Transferred Debts; A Heavy Price for Late Payments," Dow Jones & Reuters, The Wall Street Journal, Jul. 1, 2003, pp. 1-2.

(Continued)

*Primary Examiner*—James A Kramer
*Assistant Examiner*—Samica L Norman
(74) *Attorney, Agent, or Firm*—Finnegan, Henderson, Farabow, Garrett & Dunner, L.L.P.

(57) ABSTRACT

Systems and methods are disclosed for providing a financial account. The disclosed systems and methods may include providing a financial account offer to a customer. The disclosed systems and methods may also include receiving an acceptance of the offer, providing the financial account, setting an account variable equal to a first account value, and monitoring the financial account. The monitoring may further comprise resetting the account variable equal to a second account value when a number of purchase transactions corresponding to a currently monitored time period are less than a threshold value. Furthermore, the account variable may be reset equal to a third account value when the number of purchase transactions corresponding to the currently monitored time period are greater than or equal to the threshold value and a number of purchase transactions corresponding to the previous time period were less than the threshold value.

18 Claims, 3 Drawing Sheets

OTHER PUBLICATIONS

Lisa Toloken, "The Disclosure Question," Dow Jones & Reuters, Card Marketing, Aug. 16, 1999, pp. 1-4.

Ron Lieber, "The Credit Card That You Can't Get—Invitation-Only 'Black Card' Offers Concierge, Hotel Suites; But Is It Worth a $1,000 Fee?" Dow Jones & Reuters, The Wall Street Journal, Apr. 9, 2002, pp. 1-3.

* cited by examiner

METHODS AND SYSTEMS FOR ADJUSTING ACCOUNT TERMS BASED ON PURCHASE TRANSACTION INFORMATION

RELATED APPLICATION

Under provisions of 35 U.S.C. §119(e), this Application claims the benefit of U.S. Provisional Application No. 60/527,305, filed Dec. 8, 2003, which is incorporated herein by reference.

BACKGROUND

I. Technical Field

The present invention generally relates to methods and systems for providing a financial account. More particularly, the present invention relates to providing a financial account including providing, for example, an incentive directed toward retaining a customer associated with the financial account.

II. Background Information

Credit card products have become so universally well known and ubiquitous that they have fundamentally changed the manner in which financial transactions and dealings are viewed and conducted in society today. Credit card products are most commonly represented by plastic card-like items that are offered and provided to consumers through credit card issuers (such as banks and other financial institutions). With a credit card, an authorized consumer is capable of purchasing services and/or merchandise without an immediate, direct exchange of cash.

With present credit processing systems, the consumer presents a credit card or credit card number to a merchant. The merchant processes and transmits information, including credit card information and purchase amount, through an established system of electronic clearances and settlements to complete payment. The card issuer is notified of the pending transaction and is given an opportunity to approve it. If approved, a series of clearances and settlements among interchange participants (namely, the merchant, the acquiring bank, the card issuer, and/or the processing institution) results in the card issuer reimbursing the other participants in the process for the cost of the purchase. The card issuer then invoices the consumer for the amount of the purchase and may extend credit such that the consumer can pay the amount of the purchase over time.

In general, the card issuer provides the consumer with a monthly or otherwise periodic statement. The consumer may have the option to either fully pay the outstanding balance or, as a matter of necessity or choice, may defer at least a portion of the balance for later payment with accompanying interest or finance charges for the period during which payment of the outstanding debt is deferred. Following receipt of the statement, the consumer generally mails a check or money order to the card issuer.

Furthermore, interest or finance charges charged on the outstanding balance may be based on an interest rate alone. Accordingly, interest or finance charge rates may be the same no matter how many or how few transactions the cardholder makes using the card. Accordingly, a credit card account having a fixed finance charge feature may not create an incentive directed toward retaining a customer associated with the financial account.

In view of the foregoing, there is a need for methods and systems for providing a financial account more optimally. Furthermore, there is a need for providing a financial account including providing, for example, an incentive directed toward retaining a customer associated with the financial account.

SUMMARY OF THE INVENTION

Consistent with embodiments of the present invention, systems and methods are disclosed for providing a financial account.

In accordance with one embodiment, a computer implemented method for providing an incentive directed toward retaining a customer associated with a first financial account comprises providing a financial account offer of the first financial account to the customer, the offer having an account variable equal to a first account value if a number of purchase transactions associated with the first financial account during each of a plurality of predetermined contiguous time periods is greater than or equal to a threshold value for each of the plurality of predetermined contiguous time periods, receiving an acceptance of the first financial account offer from the customer, providing the first financial account to the customer, setting the account variable equal to the first account value, and monitoring the first financial account wherein each of the plurality of predetermined contiguous time periods has a corresponding number of purchase transactions wherein monitoring further comprises resetting the account variable equal to a second account value when a number of purchase transactions corresponding to a currently monitored one of the plurality of predetermined contiguous time periods are less than the threshold value, and resetting the account variable equal to a third account value when: a) the number of purchase transactions corresponding to the currently monitored one of the plurality of predetermined contiguous time periods are greater than or equal to the threshold value; and b) a number of purchase transactions corresponding to a predetermined contiguous time period previously monitored in time and contiguous with the currently monitored one of the plurality of predetermined contiguous time periods were less than the threshold value.

According to another embodiment, a system for providing an incentive directed toward retaining a customer associated with a first financial account comprises a memory storage for maintaining a database, and a processing unit coupled to the memory storage, wherein the processing unit is operative to provide a financial account offer of the first financial account to the customer, the offer having an account variable equal to a first account value if a number of purchase transactions associated with the first financial account during each of a plurality of predetermined contiguous time periods is greater than or equal to a threshold value for each of the plurality of predetermined contiguous time periods, receive an acceptance of the first financial account offer from the customer, provide the first financial account to the customer, set the account variable equal to the first account value, and monitor the first financial account wherein each of the plurality of predetermined contiguous time periods has a corresponding number of purchase transactions wherein the processing unit being operative to monitor further comprises the processing unit being operative to reset the account variable equal to a second account value when a number of purchase transactions corresponding to a currently monitored one of the plurality of predetermined contiguous time periods are less than the threshold value, and reset the account variable equal to a third account value when: a) the number of purchase transactions corresponding to the currently monitored one of the plurality of predetermined contiguous time periods are greater than or equal to the threshold value; and b) a number of purchase transactions corresponding to a predetermined contiguous time period previously monitored in time and contiguous with the currently monitored one of the plurality of predetermined contiguous time periods were less than the threshold value.

In accordance with yet another embodiment, a computer-readable medium which stores a set of instructions which when executed performs a method for providing an incentive directed toward retaining a customer associated with a first financial account, the method executed by the set of instructions comprising providing a financial account offer of the first financial account to the customer, the offer having an account variable equal to a first account value if a number of purchase transactions associated with the first financial account during each of a plurality of predetermined contiguous time periods is greater than or equal to a threshold value for each of the plurality of predetermined contiguous time periods, receiving an acceptance of the first financial account offer from the customer, providing the first financial account to the customer, setting the account variable equal to the first account value, and monitoring the first financial account wherein each of the plurality of predetermined contiguous time periods has a corresponding number of purchase transactions wherein monitoring further comprises, resetting the account variable equal to a second account value when a number of purchase transactions corresponding to a currently monitored one of the plurality of predetermined contiguous time periods are less than the threshold value, and resetting the account variable equal to a third account value when: a) the number of purchase transactions corresponding to the currently monitored one of the plurality of predetermined contiguous time periods are greater than or equal to the threshold value; and b) a number of purchase transactions corresponding to a predetermined contiguous time period previously monitored in time and contiguous with the currently monitored one of the plurality of predetermined contiguous time periods were less than the threshold value.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Systems and methods consistent with embodiments of the present invention may provide a financial account. Embodiments of the invention may relate to a financial account, such as a credit card account or a line-of-credit, for example, that includes an incentive. The incentive may be directed toward retaining a customer associated with the financial account based on the number of transactions the customer makes. In order to create the incentive, for example, contingencies, such as the number of transactions in a time period, may be set for the customer to meet in order to keep an account variable at a level favorable to the customer.

For example, a financial services provider may make a financial account offer to a prospective customer. The offer may include setting an account variable to a level favorable to the customer (e.g. a low interest rate, a low finance charge, or a low fee.) Once the customer accepts the offer and is provided the financial account, the customer's use of the financial account may be monitored. For example, the customer's number of purchase transactions within a time period may be monitored. The time period may comprise, but is not limited to, a month or a billing cycle associated with the financial account. If the customer's use of the account does not exceed a predetermined threshold value, then a notification may be sent to the customer indicating that the account variable may be adjusted to a value less favorable to the customer (e.g. the interest rate may be increased if the customer does not increase the account activity.) Following the notification, if the customer does not increase the account activity, the less favorable value may be applied to the financial account. If the less favorable value is applied to the financial account, and if the customer once again has activity on the financial account equal to or exceeding the threshold value during a future time period, the original account variable, for example, may be reapplied to the financial account.

An embodiment consistent with the invention may comprise a system for providing a financial account. The system may comprise a memory storage for maintaining a database and a processing unit coupled to the memory storage. The processing unit may be operative to provide a financial account offer of the financial account to the customer. The offer may have an account variable equal to a first account value if a number of purchase transactions associated with the financial account during each of a plurality of predetermined contiguous time periods is greater than or equal to a threshold value for each of the plurality of predetermined contiguous time periods. The processing unit may be operative to receive an acceptance of the financial account offer from the customer, provide the financial account to the customer, and set the account variable equal to the first account value. Furthermore, the processing unit may be operative to monitor the first financial account wherein each of the plurality of predetermined contiguous time periods has a corresponding number of purchase transactions. The processing unit may be further operative to reset the account variable equal to a second account value when a number of purchase transactions corresponding to a currently monitored one of the plurality of predetermined contiguous time periods are less than the threshold value. Also, the processing unit may be further operative to reset the account variable equal to a third account value when: i) the number of purchase transactions corresponding to the currently monitored one of the plurality of predetermined contiguous time periods are greater than or equal to the threshold value; and ii) a number of purchase transactions corresponding to a predetermined contiguous time period previously monitored in time and contiguous with the currently monitored one of the plurality of predetermined contiguous time periods were less than the threshold value.

Figure 1:
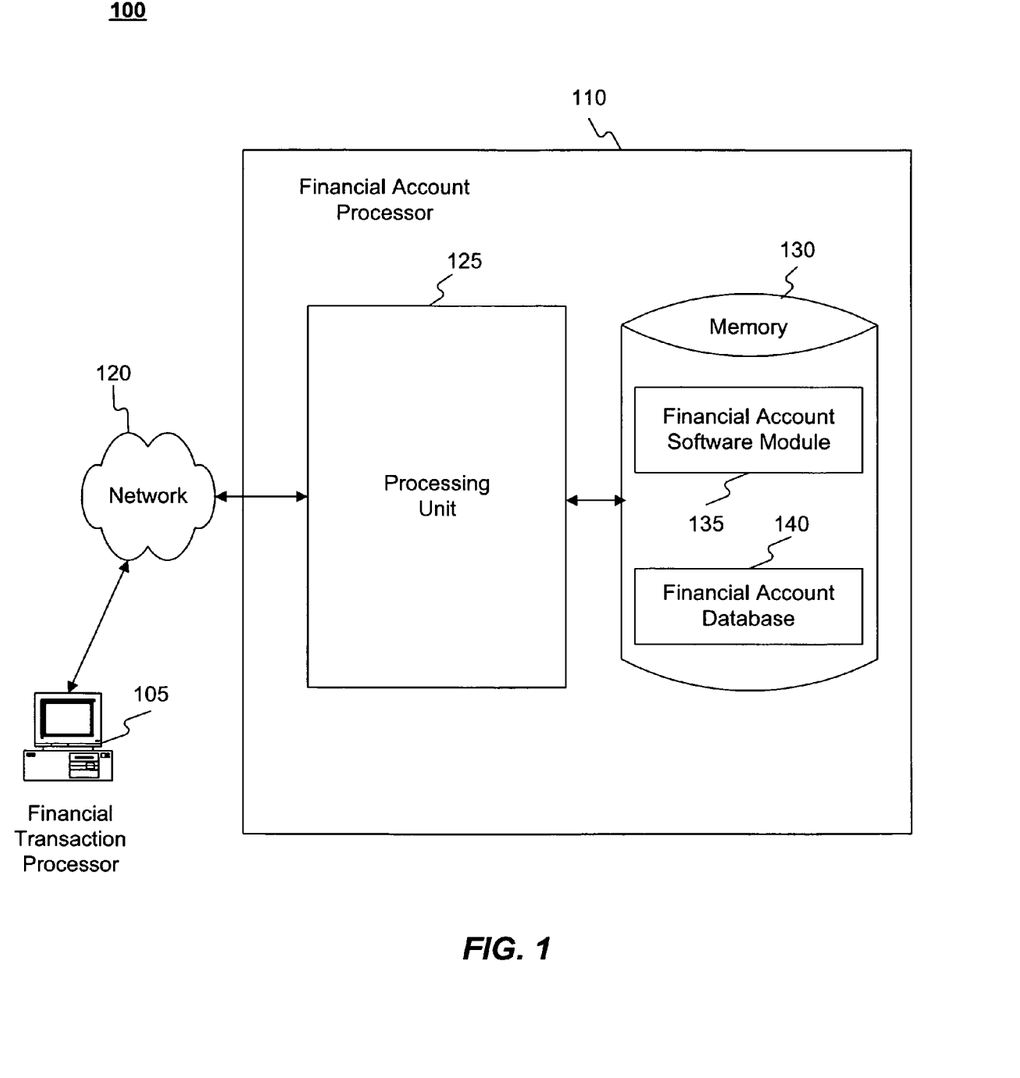
FIG. 1 is a block diagram of an exemplary system for providing a financial account consistent with an embodiment of the present invention.

Consistent with an embodiment of the present invention, the aforementioned memory, processing unit, and other components may be implemented in a financial account providing system, such as an exemplary financial account providing system 100 of FIG. 1. Any suitable combination of hardware, software and/or firmware may be used to implement the memory, processing unit, or other components. By way of example, the memory, processing unit, or other components may be implemented with any of a financial transaction processor 105 or a financial account processor 110, in combination with system 100. The aforementioned system and processors are exemplary and other systems and processors may comprise the aforementioned memory, processing unit, or other components, consistent with embodiments of the present invention.

Furthermore, the invention may be practiced in an electrical circuit comprising discrete electronic elements, packaged or integrated electronic chips containing logic gates, a circuit utilizing a microprocessor, or on a single chip containing electronic elements or microprocessors. The invention may also be practiced using other technologies capable of performing logical operations such as, for example, AND, OR, and NOT, including but not limited to mechanical, optical, fluidic, and quantum technologies. In addition, the invention may be practiced within a general purpose computer or in any other circuits or systems.

By way of a non-limiting example, FIG. 1 illustrates system 100 in which the features and principles of the present invention may be implemented. As illustrated in the block diagram of FIG. 1, system 100 may include financial transaction processor 105, financial account processor 110, and a network 120. Financial account processor 110 may include a processing unit 125 and a memory 130. Memory 130 may include a financial account software module 135 and a financial account database 140. Software module 135 residing in memory 130 may be executed on processing unit 125, may access database 140, and may implement processes for providing a financial account such as the method described below with respect to FIG. 2. Notwithstanding, processor 110 may execute other software modules and implement other processes.

Financial transaction processor 105 or financial account processor 110 ("the processors") included in system 100 may be implemented using a personal computer, network computer, mainframe, or other similar microcomputer-based workstation. The processors may, though, comprise any type of computer operating environment, such as hand-held devices, multiprocessor systems, microprocessor based or programmable sender electronic devices, minicomputers, mainframe computers, and the like. The processors may also be practiced in distributed computing environments where tasks are performed by remote processing devices. Furthermore, any of the processors may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processor may comprise other systems or devices.

Network 120 may comprise, for example, a local area network (LAN) or a wide area network (WAN). Such networking environments are commonplace in offices, enterprise-wide computer networks, intranets, and the Internet, and are known by those skilled in the art. When a LAN is used as network 120, a network interface located at any of the processors may be used to interconnect any of the processors. When network 120 is implemented in a WAN networking environment, such as the Internet, the processors may typically include an internal or external modem (not shown) or other means for establishing communications over the WAN. Further, in utilizing network 120, data sent over network 120 may be encrypted to insure data security by using known encryption/decryption techniques.

In addition to utilizing a wire line communications system as network 120, a wireless communications system, or a combination of wire line and wireless may be utilized as network 120 in order to, for example, exchange web pages via the Internet, exchange e-mails via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio, and spread spectrum radio. The processors in the wireless environment can be any mobile terminal, such as the mobile terminals described above. Wireless data may include, but is not limited to, paging, text messaging, e-mail, Internet access and other specialized data applications specifically excluding or including voice transmission.

System 100 may also transmit data by methods and processes other than, or in combination with, network 120. These methods and processes may include, but are not limited to, transferring data via, diskette, CD ROM, flash memory sticks, facsimile, conventional mail, an interactive voice response system (IVR), or via voice over a publicly switched telephone network.

Figure 2:
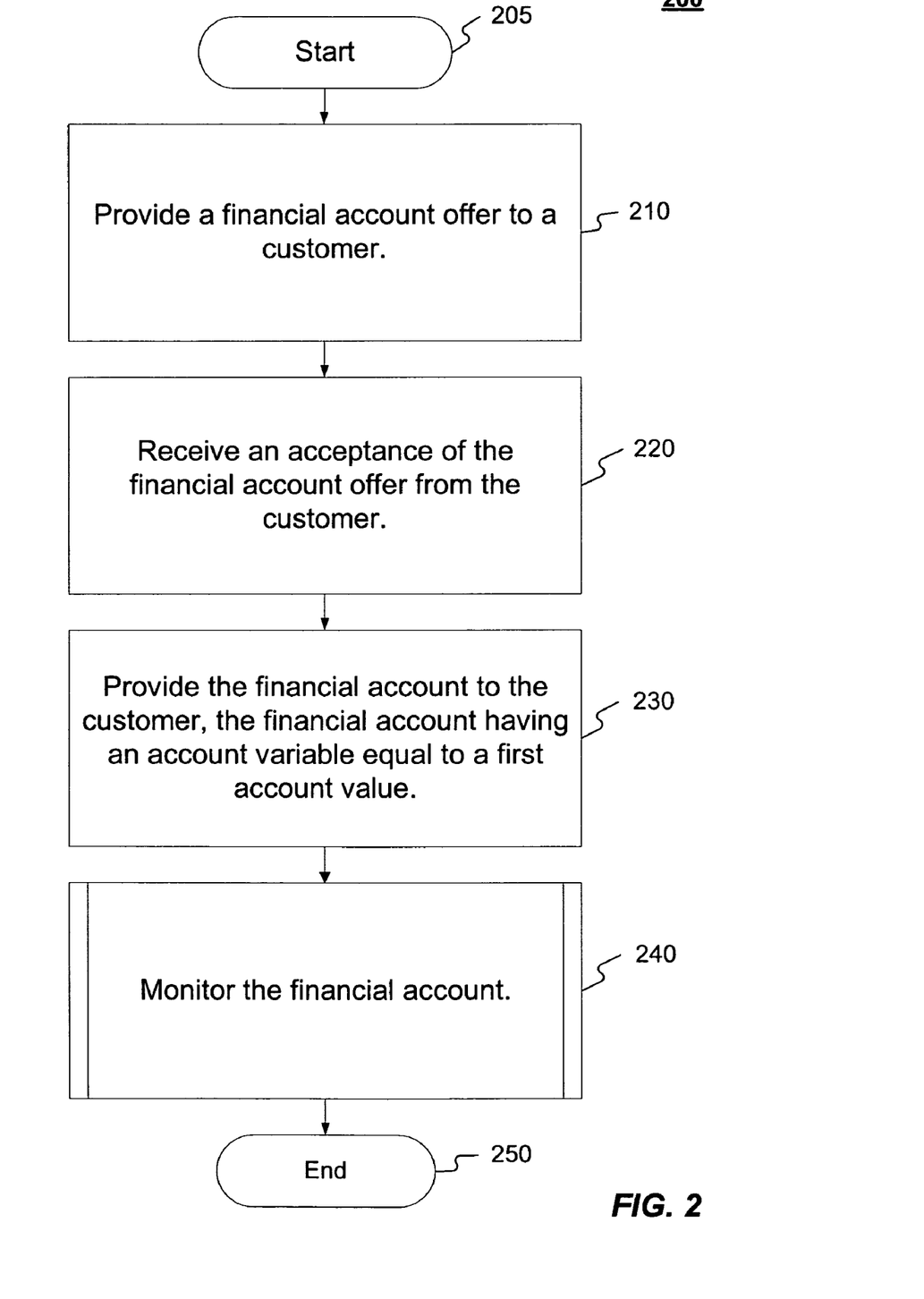
FIG. 2 is a flowchart of an exemplary method for providing a financial account consistent with an embodiment of the present invention.

FIG. 2 is a flow chart setting forth the general stages involved in an exemplary method 200 consistent with the invention for providing a financial account using system 100 of FIG. 1. Exemplary ways to implement the stages of exemplary method 200 will be described in greater detail below. Exemplary method 200 may begin at starting block 205 and proceed to stage 210 where processor 110 may provide a financial account offer to a customer. For example, processor 110 may create a solicitation including the financial account offer and distribute the solicitation to one or a plurality of prospective customers. The offer may be distributed using, for example, conventional mail, e-mail, an interactive voice response system (IVR), or via voice over a publicly switched telephone network. The aforementioned distribution processes are exemplary, and others may be used.

The financial account may be offered with an account variable equal to a first account value as long as a number of purchase transactions associated with the financial account during each of a plurality of predetermined contiguous time periods is greater than or equal to a threshold value for each of the plurality of predetermined contiguous time periods. The predetermined contiguous time periods may comprise, but are not limited to billing cycles or months. For example, the offer may require the customer to make ten transactions per month with the account in order to maintain the account variable at a level favorable to the customer. The account variable may comprise, but is not limited to a fee, a finance charge, or an interest rate. The financial account may comprise, but is not limited to a credit card account or a line-of-credit. Furthermore, the financial account offer may further include an offer to accept a funds transfer from another financial account to the financial account if the customer accepts the financial account offer.

From stage 210, where processor 110 provides the financial account offer to the customer, exemplary method 200 may advance to stage 220 where processor 110 may receive an acceptance of the financial account offer from the customer. For example, similar to distributing the offer, the acceptance may be received using, for example, conventional mail, e-mail, an interactive voice response system (IVR), or via voice over a publicly switched telephone network. The aforementioned acceptance processes are exemplary, and others may be used.

Once processor 110 receives the acceptance of the financial account offer from the customer in stage 220, exemplary method 200 may continue to stage 230 where processor 110 may provide the financial account to the customer. For example, consistent with the offer, the financial account may have the account variable equal to the first account value.

After processor 110 provides the financial account to the customer in stage 230, exemplary method 200 may proceed to exemplary subroutine 240 where processor 110 may monitor the financial account. For example, processor 110 may monitor transactions comprising, but not limited a withdrawal from the financial account, a charge to the financial account, and a payment to the financial account. The stages of exemplary subroutine 240 will be described in greater detail below with respect to FIG. 3. After processor 110 monitors the financial account in exemplary subroutine 240, exemplary method 200 may then end at stage 250.

Figure 3:
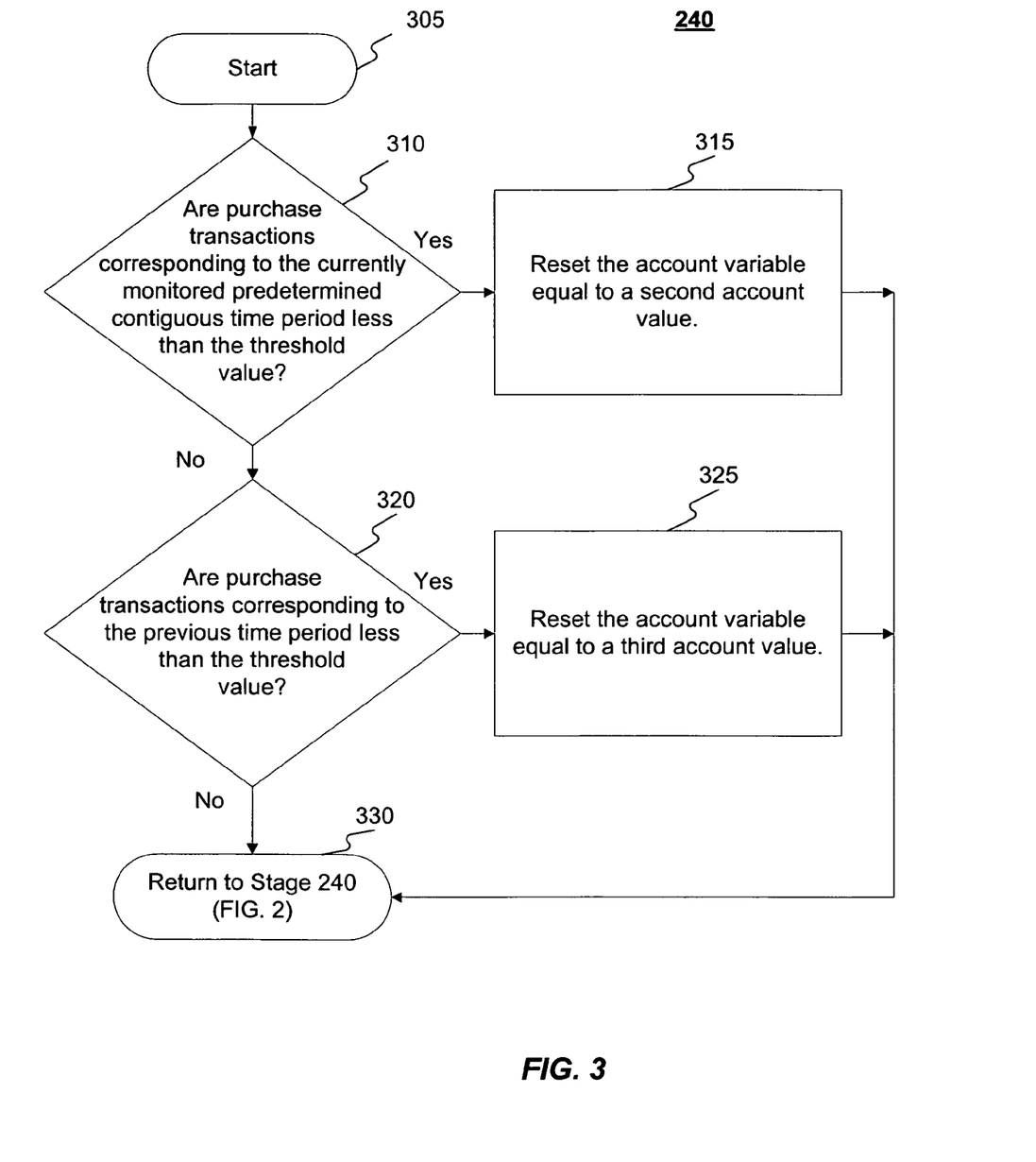
FIG. 3 is a flow chart of an exemplary subroutine used in the exemplary method of FIG. 2 for monitoring the first financial account consistent with an embodiment of the present invention.

FIG. 3 describes exemplary subroutine 240 from FIG. 2 for monitoring the first financial account. Exemplary subroutine 240 begins at starting block 305 and proceeds to decision block 310 where processor 110 may determine if a number of purchase transactions corresponding to a currently monitored one of a plurality of predetermined contiguous time periods are less than a threshold value. For example, the customer may make a number for transactions (e.g. purchases) using the financial account comprising for example, a credit card account. Financial transaction processor 105 may provide processor 110 with data corresponding to each transaction made by the customer using the credit card in this example. Financial transaction processor 105 may correspond to a retailer, and while FIG. 1 shows only one financial transaction processor, many financial transaction processor may be used corresponding to different retailers, for example. Using the transaction data received from financial transaction processor 105, processor 110 may determine if the number of received transactions are less than a threshold value. For example, if the threshold value comprises ten and the time period comprises one month, then the processor 110 may determine if the number of received transactions are less than ten for the currently monitored month.

From decision block 310, if processor 110 determines that the number of purchase transactions corresponding to the currently monitored one of the plurality of predetermined contiguous time periods are less than the threshold value, exemplary subroutine 240 may proceed to stage 315 where processor 110 may reset the account variable equal to a second account value. For example, if the threshold value comprises ten, the time period comprises one month, and the received transaction data shows only 5 transactions, then processor 110 may reset the account variable equal to the second account value. The second account value may be less favorable to the customer than the first account variable. For example, the first account variable may comprise an 11% interest rate and the second account variable may comprise a 13% interest rate.

From decision block 310, if processor 110 determines, however, that the number of purchase transactions corresponding to the currently monitored one of the plurality of predetermined contiguous time periods are not less than the threshold value, exemplary subroutine 240 may proceed to decision block 320 where processor 110 may determine if a number of purchase transactions corresponding to a predetermined contiguous time period previously monitored in time and contiguous with the currently monitored one of the plurality of predetermined contiguous time periods were less than the threshold value. For example, if the threshold value comprises ten, the time period comprises one month, previously received transaction data shows 5 transactions for the previous month, and the currently received transaction data shows 15 transactions for the current month, processor 110 may determine that the number of purchase transactions corresponding to the currently monitored month (e.g. 15) are not less than the threshold value (e.g. 10.) In this example, subroutine 240 proceeds to decision block 320.

From decision block 320, if processor 110 determines that the purchase transactions corresponding to the previous time period were less than the threshold value, exemplary subroutine 240 may proceed to stage 325 where processor 110 may reset the account variable equal to a third account value. Given the aforementioned example, the previous month's transactions were less then the threshold value and the current month's transactions are greater than the threshold value. In this example, processor 110 may reset the account variable equal to the third account value. For example, the second account variable may comprise a 13% interest rate and the third account variable may comprise a 12% interest rate. The third account value may be more favorable to the customer than the second account value and may be equal to the first account value.

From decision block 320, if processor 110 determines, however, that the purchase transactions corresponding to the previous time period were not less than the threshold value, from stage 315, or from stage 325, exemplary subroutine 240 may proceed to stage 330 and may return to stage 240 of FIG. 2. Exemplary subroutine 240 may be repeated periodically, for example, for the life of the financial account. By repeating exemplary subroutine 240 periodically, contingencies, such as the number of transactions in a time period, for example, may be set for the customer to meet in order to keep an account variable at a level favorable to the customer. If a set contingency is not met, then the account variable may be reset to a level less favorable to the customer until the customer meets the contingency once again, for example.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computer implemented method for providing an incentive directed toward retaining a customer associated with a first financial account, the method comprising:

providing a financial account offer of the first financial account to the customer, the financial account offer having an account variable equal to a first account value;

receiving an acceptance of the financial account offer from the customer;

providing the first financial account to the customer with the account variable set equal to the first account value; and monitoring, by a processor, the first financial account wherein each of a plurality of contiguous time periods has a corresponding number of purchase transactions associated with the first financial account, wherein the monitoring comprises:

determining a first number of purchase transactions corresponding to a current time period of the plurality of contiguous time periods;

resetting, by the processor, the account variable equal to a second account value when the first number of purchase transactions is less than a threshold value;

determining a second number of purchase transactions corresponding to a previous time period contiguous with the current time period after the determining of the first number of purchase transactions corresponding to the current time period; and resetting, by the processor, the account variable equal to a third account value different from the second account value when the first number of purchase transactions is greater than the threshold value and the second number of purchase transactions is less than the threshold value;

wherein the account variable comprises at least one of a fee, a finance charge, and an interest rate; and wherein the third account value is greater than the first account value and less than the second account value.

2. The method of claim 1, wherein the first financial account comprises one of a credit card account and a line-of-credit.

3. The method of claim 1, wherein at least one of the purchase transactions associated with at least one of the plurality of contiguous time periods comprises at least one of a withdrawal from the financial account, a charge to the financial account, and a payment to the financial account.

4. The method of claim 1, wherein providing the financial account offer further comprises providing the financial account offer including an offer to accept a funds transfer from a second financial account to the first financial account when the customer accepts the financial account offer.

5. The method of claim 4, further comprising accepting the funds transfer to the first financial account from the second financial account.

6. The method of claim 1, wherein at least one of the plurality of contiguous time periods corresponds to a billing cycle associated with the financial account.

7. A system for providing an incentive directed toward retaining a customer associated with a first financial account, the system comprising:

a memory storage for maintaining a database; and a processing unit coupled to the memory storage, wherein the processing unit is operative to implement a process comprising:

providing a financial account offer of the first financial account to the customer, the financial account offer having an account variable equal to a first account value;

receiving an acceptance of the first financial account offer from the customer;

providing the first financial account to the customer with the account variable set equal to the first account value; and monitoring the first financial account wherein each of a plurality of contiguous time periods has a corresponding number of purchase transactions associated with the first financial account, and wherein monitoring comprises:

determining a first number of purchase transactions corresponding to a current time period of the plurality of contiguous time periods;

resetting the account variable equal to a second account value when the first number of purchase transactions is less than a threshold value;

determining a second number of purchase transactions corresponding to a previous time period contiguous with the current time period after the determining of the first number of purchase transactions corresponding to the current time period; and resetting the account variable equal to a third account value different from the second account value when the first number of purchase transactions is greater than the threshold value and the second number of purchase transactions is less than the threshold value;

wherein the account variable comprises at least one of a fee, a finance charge, and an interest rate; and wherein the third account value is greater than the first account value and less than the second account value.

8. The system of claim 7, wherein the first financial account comprises one of a credit card account and a line-of-credit.

9. The system of claim 7, wherein at least one of the purchase transactions associated with at least one of the plurality of contiguous time periods comprises at least one of a withdrawal from the financial account, a charge to the financial account, and a payment to the financial account.

10. The system of claim 7, wherein the process implemented by the processing unit further comprises providing the financial account offer including an offer to accept a funds transfer from a second financial account to the first financial account when the customer accepts the financial account offer.

11. The system of claim 10, the process implemented by the processing unit further comprising accepting the funds transfer to the first financial account from the second financial account.

12. The system of claim 7, wherein at least one of the plurality of contiguous time periods corresponds to a billing cycle associated with the financial account.

13. A non-transitory computer-readable medium which stores a set of instructions which, when executed by a processor, performs a method for providing an incentive directed toward retaining a customer associated with a first financial account, the method comprising:

providing a financial account offer of the first financial account to the customer, the financial account offer having an account variable equal to a first account value;

receiving an acceptance of the first financial account offer from the customer;

providing the first financial account to the customer with the account variable set equal to the first account value; and monitoring the first financial account wherein each of the plurality of contiguous time periods has a corresponding number of purchase transactions associated with the first financial account, wherein monitoring comprises:

determining a first number of purchase transactions corresponding to a current time period of the plurality of contiguous time periods;

resetting the account variable equal to a second account value when the first number of purchase transactions is less than a threshold value;

determining a second number of purchase transactions corresponding to a previous time period relative to the current time period; and resetting the account variable equal to a third account value different from the second account value when the first number of purchase transactions is greater than the threshold value and the second number of purchase transactions is less than the threshold value;

wherein the account variable comprises at least one of a fee, a finance charge, and an interest rate; and wherein the third account value is greater than the first account value and less than the second account value.

14. The non-transitory computer readable medium of claim 13, wherein the first financial account comprises one of a credit card account and a line-of-credit.

15. The non-transitory computer readable medium of claim 13, wherein at least one of the purchase transactions comprises at least one of a withdrawal from the financial account, a charge to the financial account, and a payment to the financial account.

16. The non-transitory computer readable medium of claim 13, wherein providing the financial account offer further comprises providing the financial account offer including an offer to accept a funds transfer from a second financial account to the first financial account when the customer accepts the financial account offer.

17. The non-transitory computer readable medium of claim 16, further comprising accepting the funds transfer to the first financial account from the second financial account.

18. The non-transitory computer readable medium of claim 13, wherein at least one of the plurality of contiguous time periods corresponds to a billing cycle associated with the financial account.

* * * * *